Jan. 30, 1962   E. WYGASCH ET AL   3,019,082
PRODUCTION OF CONCENTRATED ALKALI SOLUTIONS
Filed July 5, 1957
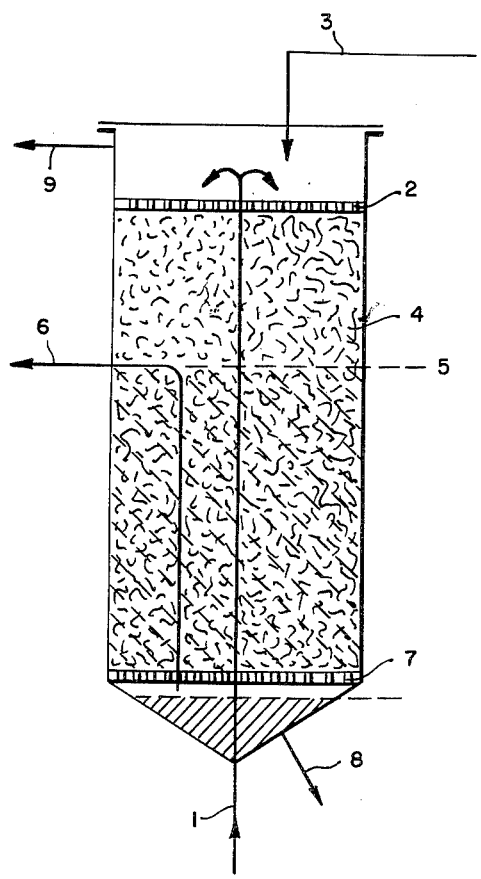
INVENTORS:
EWALD WYGASCH
ROLF LUEHDEMANN
BY
ATT'YS United States Patent Office — 3,019,082
Patented Jan. 30, 1962

3,019,082
PRODUCTION OF CONCENTRATED ALKALI SOLUTIONS
Ewald Wygasch and Rolf Luehdemann, Ludwigshafen (Rhine), Germany, assignors to Badische Anilin- & Soda-Fabrik Aktiengesellschaft, Ludwigshafen (Rhine), Germany
Filed July 5, 1957, Ser. No. 670,271
Claims priority, application Germany July 19, 1956
3 Claims. (Cl. 23—184)

This invention relates to improvements in the production of concentrated caustic alkali liquors by decomposition of alkali amalgam with water.

The alkali amalgam produced by electrolysis of alkali metal chloride in the so-called primary cell is split up into caustic alkali solution and hydrogen in a decomposer (secondary cell) by reaction with water in the presence of a catalyst, while the mercury, impoverished in alkali metal or free therefrom, passes again into the primary cell. In this way alkali liquor concentrations of about 45 to 50% can be achieved without substantial difficulty both in horizontal and vertical decomposers of known design. If it is desired to satisfy the increasing demand for more highly concentrated liquors, not by evaporation of liquors of lower concentrations but directly by decomposition of alkali amalgam, difficulties are encountered which are caused by the sharply increasing melting point and viscosity of the liquors with increasing concentration. The melting point of 73% caustic soda solution for example amounts to about 60° C., of 80% solution 143° C. and of 85% solution 210° C. In horizontal decomposers therefore the catalyst, in consequence of local overconcentration which is caused by insufficient movement of the liquor and by too little diffusion in consequence of the high viscosity, becomes covered with solid alkali and therefore becomes inactive, irrespective of whether the amalgam is led in concurrent or countercurrent to the water serving for its decomposition. An additional heating of the decomposer where this is possible does not bring any satisfactory solution of the problem.

In a vertical decomposer in which amalgam and water are led in countercurrent, the following disadvantages occur: In the upper part of the decomposer, from which the concentrated liquor is withdrawn, the reaction of the amalgam at the catalyst with the highly concentrated liquor takes place rather slowly so that the main reaction takes place in the lower part of the decomposer. The increase in temperature favouring the reaction and caused by the heat of the decomposition reaction thus takes place mainly in that part of the decomposer where the liquor has the lowest concentration, and the amalgam or mercury leads the greater part of the reaction heat directly into the primary cell where a further increase in temperature is often undesirable. Attempts have been made to avoid this disadvantage by utilizing the heat of reaction in heat exchangers for heating up the decomposition water. The bulk of the hydrogen is also produced in the lower part of the decomposer. The large amount of gas saturated with water vapour effects a strong whirling up of the catalyst which usually consists of pieces of graphite of the size of hazel nuts to walnuts. The graphite abrades rapidly and the initial sharp-edged pieces with a large active surface are soon rounded and suffer in activity. The liquor produced is coloured black by the abraded graphite and must be filtered. In order to produce highly concentrated liquor, decomposers have been built several metres high, subdivided into individual chambers, or two decomposers have been superposed one on the other, in order to produce highly concentrated liquor in one decomposer and completely to decompose the incompletely decomposed amalgam in the second decomposer with the formation of less highly concentrated liquor. The great height of such decomposers necessitates a considerable expenditure of energy for the conveyance of the amalgam or mercury.

According to another known proposal the amalgam and water are first led in concurrent through a vertical decomposer with the production of highly concentrated liquor and partial decomposition of the amalgam and then the partly decomposed amalgam is led through a horizontal decomposer in which it comes into contact with water flowing in countercurrent for complete decomposition.

We have now found that highly concentrated caustic alkali liquor can be obtained in a single relatively low vertical decomposer while practically completely decomposing the amalgam without the subsequent arrangement of a further decomposition apparatus by allowing amalgam and water to run down freely in concurrent over the catalyst in the upper part of the decomposer, while the catalyst in the lower part of the decomposer is immersed in a coherent layer of liquor.

By working in this way, the decomposition reaction takes place mainly in the upper part of the decomposer from which the disengaged hydrogen and water vapour can escape freely without causing any whirling up and attrition of the catalyst. It is true that part of the heat evolved by the decomposition reaction is lost with the effluent hydrogen and water vapour, but the greater part is led with the amalgam into the lower part of the decomposer and there given up to the concentrated liquor. In spite of the lower concentration of amalgam in the lower part, the residual decomposition here is fairly complete. Since in the lower part only small amounts of amalgam need to be decomposed and therefore only small amounts of hydrogen are formed, there also does not take place here any whirling up of the catalyst and inactivation of the same.

The present process permits not only the production of highly concentrated liquor with the aid of water, but it is also possible to introduce the water for the decomposition of the amalgam in the form of caustic alkali liquor and thereby to convert for example a 55% caustic soda solution into a 70 to 75% caustic soda solution. Since 50 to 55% caustic soda liquor can easily be prepared in known decomposers, the charging of a decomposer according to the present invention with such a liquor of low concentration leads to a highly concentrated end product without additional expenditure of energy. For example, a decomposer according to this invention attached to a primary cell of 30 ka. which when charged with water yields about 1 metric ton per day of sodium hydroxide (100%) in the form of a 50% or 70% liquor, when charged with 50% liquor from other cells yields 2.54 metric tons per day of sodium hydroxide (100%) in the form of 70% caustic soda solution or, charged with 55% liquor, 3.26 metric tons per day of sodium hydroxide (100%) in the form of 70% caustic soda solution. The at least equally good manner of operation of the decomposer according to this invention when charged with liquor instead of with water is attributable to the fact that the 50 to 55% caustic soda solution originating from other sources enters the decomposer at a temperature of about 70° C. and further that a larger volume comes into contact with the amalgam in the free part of the decomposer and that finally by reason of the higher boiling point of the liquor introduced there occurs less loss of heat by removal with water vapour.

An apparatus suitable for carrying out the process according to this invention is illustrated diagrammatically in the accompanying drawing by way of example.

The amalgam coming from the primary cell is supplied to the top of the decomposer by means of a pump through a rising pipe 1 which opens into the top of the decomposer and is preferably arranged centrally. The amalgam then passes onto a perforated plate 2 or other distributing means by which it, together with the water introduced through a pipe 3 is uniformly dispersed over the cross-section of the decomposer. The amalgam and water trickle down over the catalyst filling 4 which consists of graphite in the form of pieces of a size of about 5 to 20 millimetres. Below the dotted line 5 the catalyst filling is immersed in liquor of a concentration which increases downwards. The dip tube 6 serves for withdrawing the concentrated liquor from the foot of the decomposer and the maintenance of the level of liquor up to the line 5. The ratio between the height of the liquor level and the remaining height of the decomposer preferably amounts to 1:1 to 2:1. A sieve plate 7 supports the catalyst filling, but allows the mercury and liquor to pass downwardly through it. The mercury leaves the decomposer through a pipe 8 and is returned to the primary cell. The hydrogen formed by the decomposition is withdrawn at the top of the decomposer through a pipe 9.

In an apparatus such as this it is possible to produce for example 70 to 75% caustic soda solution in a water-white nature without filtration, the amalgam being decomposed to the extent of 85 to 95%, and a subsequent decomposition is not necessary so far as the operation of the primary cell is concerned. No reduction in the activity of the catalyst can be detected even after operation for long periods. If an attempt is made to carry out the decomposition of the amalgam with water or liquor in a decomposer of the same height containing a catalyst filling to the same height but without maintaining a coherent layer of liquor in the lower part of the decomposer, only incomplete decomposition of the amalgam is achieved and a subsequent decomposition is necessary to avoid disturbance in the operation of the primary cell.

We claim:

1. A process for the recovery of caustic alkali from an alkali metal amalgam which comprises passing said amalgam and an aqueous decomposing liquid in concurrent flow downwardly through a particulate and continuous catalyst bed, the first section of said catalyst bed being porous and gas filled, the second section of said continuous catalyst bed being submerged in a caustic liquor, and thereafter withdrawing the aqueous caustic solution from the said second section of the said catalyst bed at a point wherein the caustic concentration is at a maximum.

2. The process of claim 1 wherein the volume ratio of the gas filled porous section of the catalyst bed to the section submerged in caustic liquor is of the order of 1:1 to 1:2.

3. The process of claim 1 wherein the aqueous decomposing liquid is an aqueous caustic soda solution of less than 75% concentration.

References Cited in the file of this patent

UNITED STATES PATENTS

| | | |
|---|---|---|
| 2,527,443 | Padgitt | Oct. 24, 1940 |
| 2,698,779 | Adams et al. | Jan. 4, 1955 |
| 2,732,284 | Sakowski | Jan. 24, 1956 |
| 2,762,683 | Massey | Sept. 11, 1956 |
| 2,801,163 | Conforto | July 30, 1957 |
| 2,835,559 | Bahr | May 20, 1958 |
| 2,938,773 | Kooistra | May 31, 1960 |